United States Patent
Ames

(10) Patent No.: US 8,810,056 B2
(45) Date of Patent: Aug. 19, 2014

(54) OCEAN WAVE ENERGY CONVERTER UTILIZING DUAL ROTORS

(71) Applicant: P. Foerd Ames, Bristol, RI (US)

(72) Inventor: P. Foerd Ames, Bristol, RI (US)

(*) Notice: Subject to any disclaimer, the term of this patent is extended or adjusted under 35 U.S.C. 154(b) by 148 days.

(21) Appl. No.: 13/623,616

(22) Filed: Sep. 20, 2012

(65) Prior Publication Data

US 2013/0069370 A1 Mar. 21, 2013

Related U.S. Application Data

(60) Provisional application No. 61/536,642, filed on Sep. 20, 2011.

(51) Int. Cl.
*F03B 13/10* (2006.01)

(52) U.S. Cl.
USPC .............................. 290/53; 290/42

(58) Field of Classification Search
USPC ....................... 290/53, 42; 310/178
See application file for complete search history.

(56) References Cited

U.S. PATENT DOCUMENTS

| | | |
|---|---|---|
| 659,609 A | 10/1900 | McIntyre |
| 3,746,875 A | 7/1973 | Donatelli |
| 3,894,241 A | 7/1975 | Kaplan |
| 3,927,436 A | 12/1975 | Inoue et al. |
| 3,961,863 A | 6/1976 | Hooper, III |
| 3,965,365 A | 6/1976 | Parr |
| 4,012,964 A | 3/1977 | Lee |
| 4,208,600 A * | 6/1980 | Hatch ........................... 310/178 |
| 4,232,230 A | 11/1980 | Ames |
| 4,341,074 A | 7/1982 | French |
| 4,352,299 A | 10/1982 | Riggs et al. |
| 4,495,765 A | 1/1985 | French |
| 4,503,349 A * | 3/1985 | Miller ........................... 310/178 |
| 4,560,884 A | 12/1985 | Whittecar |
| 4,599,858 A | 7/1986 | La Stella et al. |
| 4,660,698 A | 4/1987 | Miura |
| 4,672,222 A | 6/1987 | Ames |
| 4,684,815 A | 8/1987 | Gargos |
| 4,686,377 A | 8/1987 | Gargos |
| 4,742,241 A | 5/1988 | Melvin |
| 4,748,338 A | 5/1988 | Boyce |
| 4,754,157 A | 6/1988 | Windle |
| 5,182,957 A | 2/1993 | Bohmer et al. |
| 5,333,351 A | 8/1994 | Sato |
| 5,359,229 A | 10/1994 | Youngblood |
| 5,424,582 A | 6/1995 | Trepl, II et al. |
| 5,694,812 A | 12/1997 | Maue et al. |
| 5,854,516 A | 12/1998 | Shim |
| 5,921,082 A | 7/1999 | Berling |

(Continued)

*Primary Examiner* — Vanessa Girardi

(74) *Attorney, Agent, or Firm* — Barlow, Josephs & Holmes, Ltd.

(57) ABSTRACT

An apparatus for converting the kinetic energy of ocean waves into electricity is disclosed. The apparatus includes a main body member. A generator is located within the main body member. The generator includes a axle having a positive direction and a negative direction. An inner rotor is driven by the axle, wherein the inner rotor is driven only in the negative direction of the axle. An outer rotor surrounds the inner rotor and is also being driven by the axle, wherein the outer rotor is driven only in the positive direction of the driveshaft. A stationary ring is located between the inner rotor and the outer rotor. A drive rod, having a buoy attached to one end, is configured to freely move between an upstroke position and a downstroke position. The drive rod drives the generator as it reciprocates between the upstroke position and the downstroke position.

8 Claims, 6 Drawing Sheets

(56) References Cited

U.S. PATENT DOCUMENTS

| | | |
|---|---|---|
| 5,929,531 A | 7/1999 | Lagno |
| 5,929,548 A * | 7/1999 | Pinkerton et al. ............. 310/166 |
| 6,020,653 A | 2/2000 | Woodbridge et al. |
| 6,026,536 A | 2/2000 | Miller et al. |
| 6,269,636 B1 | 8/2001 | Hatzilakos |
| 6,388,347 B1 | 5/2002 | Blake et al. |
| 7,141,888 B2 | 11/2006 | Sabol et al. |
| 7,164,212 B2 | 1/2007 | Leijon et al. |
| 7,199,481 B2 | 4/2007 | Hirsch |
| 7,242,106 B2 | 7/2007 | Kelly |
| 7,245,041 B1 | 7/2007 | Olson |
| 7,298,054 B2 | 11/2007 | Hirsch |
| 7,352,073 B2 | 4/2008 | Ames |
| 7,489,060 B2 * | 2/2009 | Qu et al. ...................... 310/178 |
| 2006/0273594 A1 | 12/2006 | Gehring |
| 2007/0040384 A1 | 2/2007 | Bernhoff et al. |
| 2007/0080539 A1 | 4/2007 | Kelly |
| 2007/0132246 A1 | 6/2007 | Hirsch |
| 2007/0228736 A1 | 10/2007 | Smushkovich |
| 2007/0228737 A1 | 10/2007 | Hirsch |
| 2007/0278887 A1 * | 12/2007 | Durham et al. ............... 310/178 |

\* cited by examiner

OCEAN WAVE ENERGY CONVERTER UTILIZING DUAL ROTORS

CROSS-REFERENCE TO RELATED APPLICATION

This patent document claims priority to earlier filed U.S. Provisional Patent Application Ser. No. 61/536,642, filed on Sep. 20, 2011, the entire contents of which are incorporated herein by reference.

BACKGROUND

1. Technical Field

The present patent document relates generally to an apparatus for converting the energy of wave motion on the surface of a body of water to electricity.

2. Background of the Related Art

Generating electricity via ocean waves is a renewable energy source that has yet to be fully realized. Because ocean wave energy represents an unlimited, clean, renewable energy source, harnessing it is highly desirable to power our modern society.

Prior ocean wave energy converters, such as Ames, U.S. Pat. Nos. 4,232,230; 4,672,222; and 7,352,073 (incorporated herein by reference), although revolutionary in concept and design, suffer from several limitations. The '073 patent, in particular, includes a generator that rotates with magnets and coils, but problems with the arrangement include (1) a requirement for commutation brushes that become worn or compromised in the marine environment and (2) difficulty in adjusting coil properties due to their motion.

Also because wave energy converters are generally deployed in the ocean, they must be securely anchored lest they become navigation hazards or get damaged. However, traditional mooring methods involve setting multiple lines or fixed columns to the sea floor. This method is very costly, difficult and dangerous as it involves expensive equipment and possibly diving to depths of the ocean with all the known hazards thereof.

Therefore, there is a perceived need in the industry for an improved generator that lacks commutation brushes and an ability to adjust load properties during use. Furthermore is desirable to have a less costly method of anchoring the energy converters to the sea floor that minimizes the time that divers and submersibles must be used.

SUMMARY

The present invention solves the problems of the prior art by providing an improved generator that includes counter-rotating magnet rings of weight and size efficiently correlating to ratio between upstroke buoyancy force and downstroke gravity force. Furthermore, the coils are fixed thereby eliminating brushes, and allowing easier incorporation of shields and/or weather-proof housing. Additionally, switch components are more readily affixed to stationary coils, than moving coils, so that some coils may be taken out of circuit. The coils are further configured to be isolated from the circuit sot that the load on the buoy may be adjusted, resulting in near fully submerged buoy that more precisely follows complex waves while also providing maximal buoyancy force for power take-off. Finally, the counter-rotating magnet rotors add velocities together to increase polarity switch rate affecting coils.

In addition, the mooring system includes a plurality of mooring lines conjoined to terminals, at various intervals of lower depth, thereby resulting in fewer anchor points than if lines were not conjoined. Mooring line terminals may simply comprise knotting of the disparate lines but such assembly does not obviate forces that may limit mooring line flexibility when exposed to tensile forces. In a preferred embodiment, the mooring lines are conjoined, at successively lower levels, to terminate at singular anchor points. Because the number of lines decreases at each depth level, the time needed for divers and submersibles for repair, maintenance and installation is significantly reduced compared to traditional multi-line mooring techniques.

BRIEF DESCRIPTION OF THE DRAWINGS

These and other features, aspects, and advantages of the present invention will become better understood with reference to the following description, appended claims, and accompanying drawings where:

DESCRIPTION OF THE PREFERRED EMBODIMENT

Figure 1:
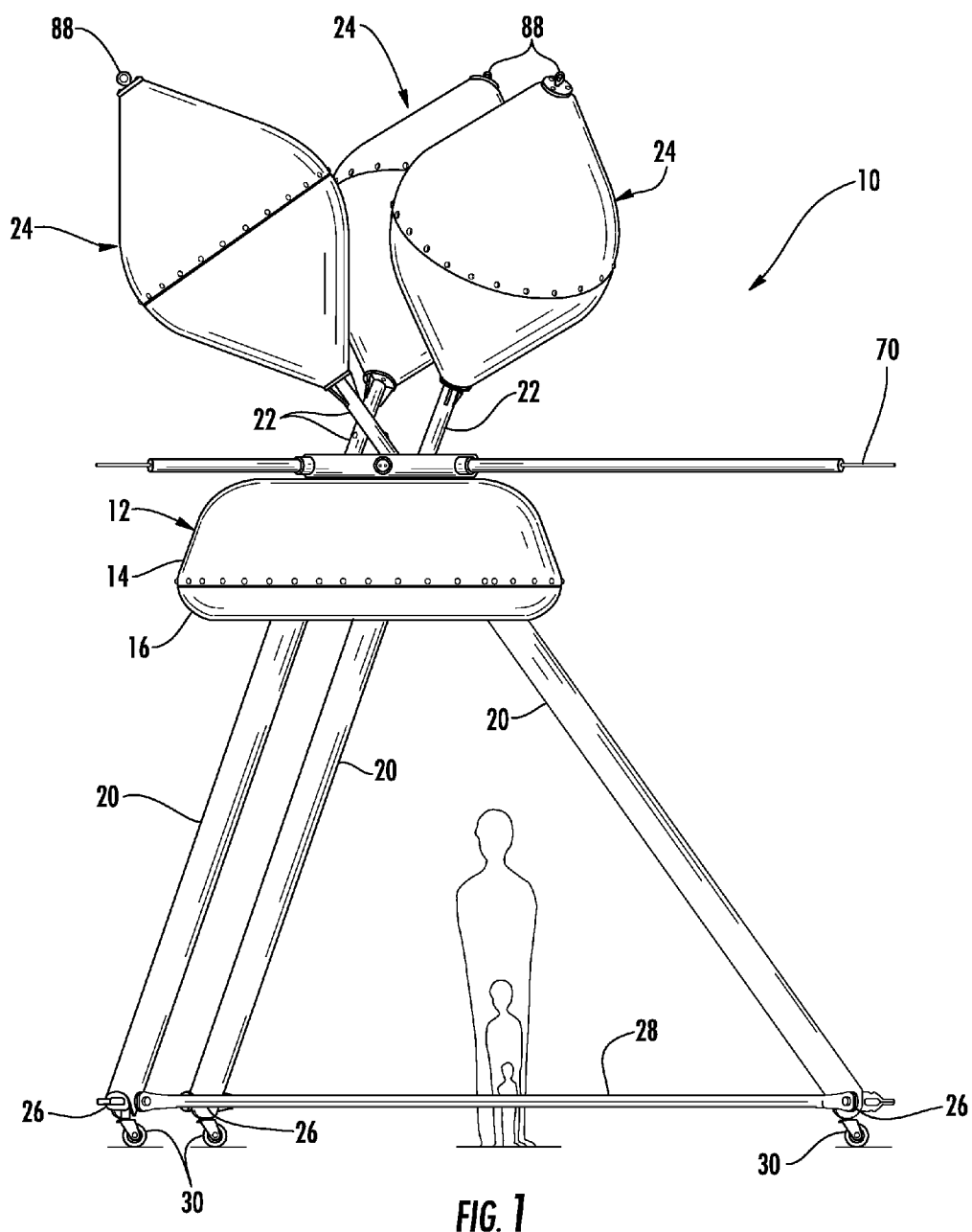
FIG. 1 is a perspective view of a preferred embodiment of the ocean wave energy converter of the present invention.
Figure 2:
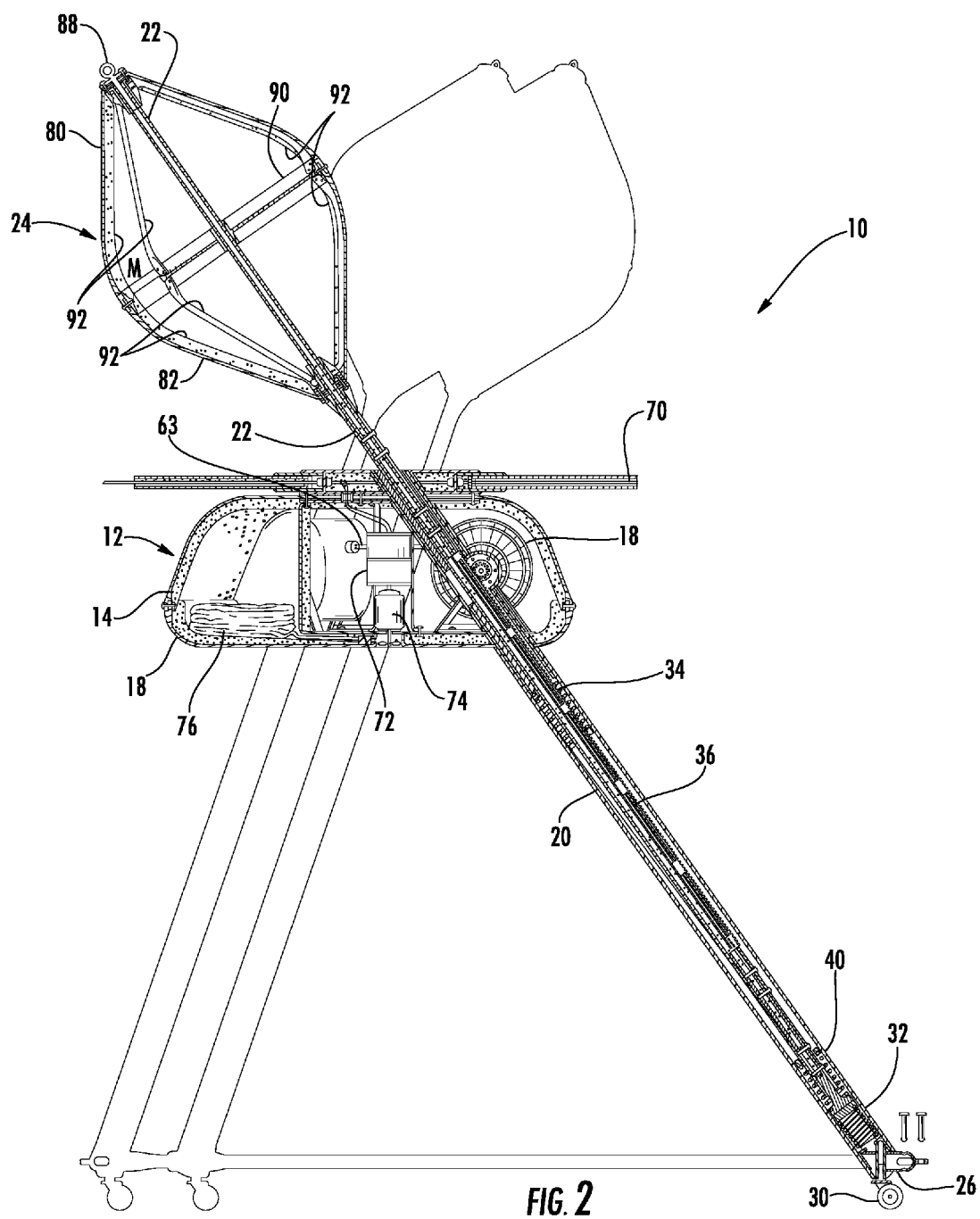
FIG. 2 is a partial cross-section view of FIG. 2.

Referring to FIGS. 1 and 2, the ocean wave energy converter assembly of the present invention is shown generally at 10. As will be more fully described below, the assembly of the present invention includes three tubular framing members 20 positioned in a tetrahedral arrangement that has a main body member 12 connected at the apex of the tetrahedron. Each of the tubular framing members 20 contains a drive rod 22 slidably received therein. Each drive rod 22 is respectively connected to its own buoy 249. The assembly 10 of the present invention can be scaled appropriately to an optimal size for the known conditions or factors at the desired deployment site, such as average wave height, historical maximum wave height, depth of water, strength of currents, etc. One skilled in the art would appreciate how to select the parts and materials to construct an assembly of the present invention of the desired size.

The main body member 12 of the assembly 10 includes a top shell 14 and a bottom shell 16. The top shell 14 and bottom shell 16 are secured together around a chassis to form a water-tight inner cavity to contain the generator 18 and ballast control components. Each shell 14, 16 is lined with structural foam or other buoyant material to neutralize the buoyancy of the chassis, strengthen the material forming the shells 14, 16, and insulate the components contained therein.

Each assembly 10 includes three tubular framing members 20 that are arranged in a cone structure or more specifically as edges of the sides of a tetrahedron. The tubular framing members 20 connect to the main body 12 member, forming the apex of the tetrahedron. The tubular framing members 20 attach to the chassis of the module 10 and may be split into sections above and below the chassis. Each tubular framing member 20 contains a drive rod 22, which is provided at its upper end with a buoy 24. The tubular framing members 20 terminate at tube base connectors 26 securing them to frame members 28 which may form an equilateral triangle. A damper plate may be supported between the frame members 28. Although it is preferred that the arrangement of the tubular framing members 20 is tetrahedral, other geometric-shaped arrangements could be used and would be effective. The base connectors 26 may include optional casters 30 to facilitate transportation, deployment and recovery of the assembly.

Contained within the terminal end of each tubular framing member 20 is a lower shock absorber 32. The lower shock absorber 32 receives the downward stroke of its respective drive rod 22. The lower shock absorber 32 reduces the stress on the assembly 10 and prepares the drive rod 22 for its upward stroke as it upwardly urges the drive rod 22. At the upper end of each tubular member 20 is an upper shock absorber 34. The upper shock absorber 34 provides an upper travel limit to the upward stroke of its respective drive rod 22. The upper shock absorber 34 reduces the stress on the assembly 10, and prepares the drive rod 22 for its downward stroke as it downwardly urges the drive rod 22. Both the lower shock absorber 32 and upper shock absorber 34 are preferably non-metallic springs, but metal or other compressible materials could be used as appropriate for the size of the assembly in question. It is important to note that the upper and lower shock absorbers 32, 34 will not be engaged regularly. In a typical deployment the module 10 are sized for deployment in an environment with wave size complimentary to the size of the module 10. The shock absorbers 32, 34 provide a mechanism to reduce stress and wear on the module during heavy seas.

The tubular framing members 20 serve respectively as guides or sleeves for a drive rod 22 contained therein. The drive rods 22 each have a rack 36 secured to the length of the drive rod 22 that passes through a gear box section of the main body member 12. The rack 36 has teeth thereon, which engage and drive a gear 38 in the gear box section (described below). The drive rods 22 also may be partially or wholly filled with foam, or other buoyant material, to neutralize the buoyancy of the drive rod 22, thereby enhancing the buoyancy of the buoy 24. A secondary shock absorber 40 is attached to the lower end of the drive rod 22. The secondary shock absorber 40 of the drive rod 22 works in conjunction with the upper shock absorber 34 in the respective tubular framing member 20 to limit the upward travel of the drive rod 22 and reduce the stress thereon.

Figure 3:
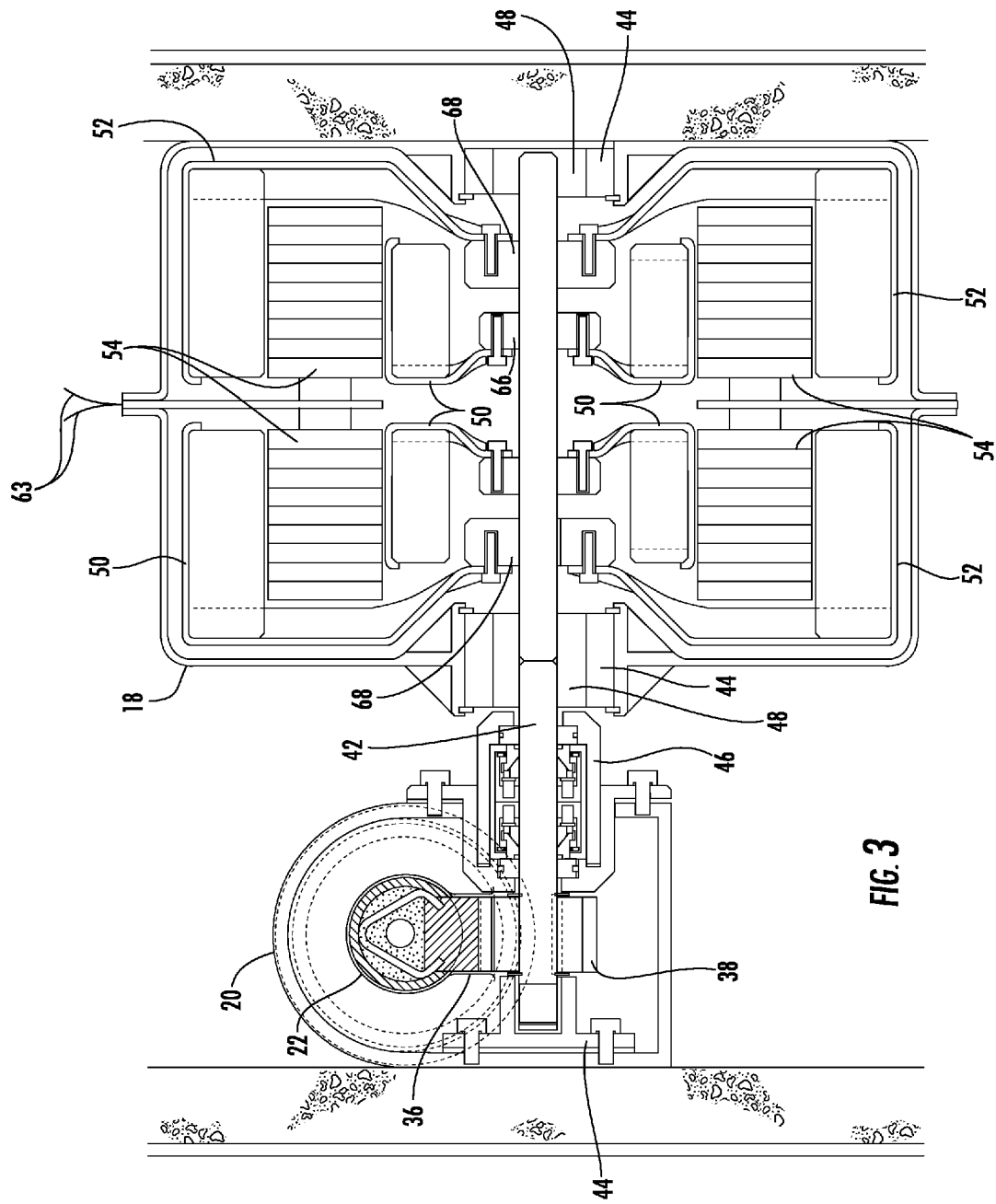
FIG. 3 is a top cross-section view of the gearbox and generator.
Figure 4:
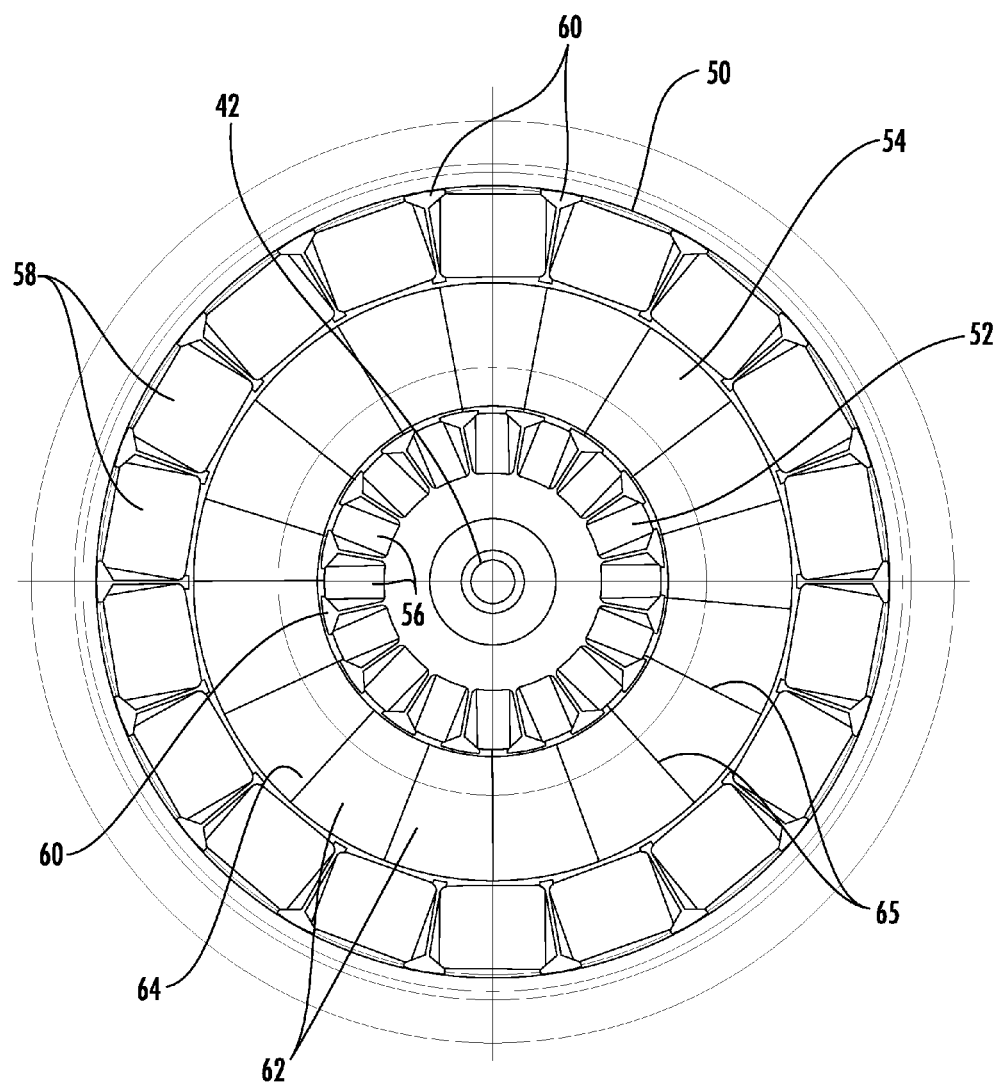
FIG. 4 is a side cross-section view of the generator.

Referring to FIGS. 3 and 4, a close up view of the gear box section and generator 18 of the main body member 12 of the preferred embodiment are shown in detail. As the gear 38 is driven by the drive rod 22, the gear 38 drives an axle 42 which is rotatably mounted within an axle brackets 44. The axle 42 extends through a double labyrinth seal 46 and through a bushing 48 and into a generator 18. The opposite end of the axle 42 is supported by a bushing 48 and axle bracket 44. Although a double labyrinth seal is preferred, other seals could be used. Bearings may be included to smooth the rotation action on the axle 42. Optional bushings may also be included to dampen any vibration generated by the general operation of the assembly.

The generator 18 includes an inner rotor 50, a counter-rotating outer rotor 52, and a stationary ring 54 positioned between then inner and outer rotors 50, 52. The inner rotor 50 is preferably constructed of a circular array of sixteen permanent magnets 56, although other numbers of magnets could be used. The outer rotor 52 is preferably constructed of a circular array of eighteen permanent magnets 58, although other numbers of magnets could be used. A number of T-shaped brackets 60 may be used to arrange the magnets concentrically about each rotor 50, 52. The inner rotor 50 and outer rotor 52 may also be formed from electromagnets as well, thereby making the generator 18 an alternator instead. The stationary ring 54 is constructed of one or more coils 62, preferably seventeen although sixteen or eighteen could be used, of a number of loops of wire having an input lead and an output lead. The stationary ring 54 is fixed in position within the generator 18 and does not rotate. Shielding 65 may be provided between each coil 64.

A first pair of clutches 66 connects the inner rotor 50 to the axle 42 and allows the axle 42 to turn the inner rotor 50 in one direction only. A second pair of clutches 68 connects the outer rotor 52 to the axle 42 and allows the outer rotor 52 to only turn in the opposite direction of the inner rotor 50. Rotational movement of the inner rotor 50 relative to stationary ring 18 induces electricity in the coils 62 and through leads 63. Inducing electricity in a coil through use of a magnet is well-known in the art and does not need to be described in detail herein. The leads are connected to a cord 70 which carries the generated electricity to other modules or shore as described below.

In an alternative embodiment, the inner rotor and outer rotor of the generator are constructed of one or more coils of a number of loops of wire and the stationary ring is constructed of a circular array of permanent magnets. Thus, being the opposite of the preferred embodiment. If electromagnets are used in place of permanent magnets, load balancing may be accomplished by selectively energizing coils as is known in the art with alternators.

The inner cavity of the main body member 12 also includes an active ballast control system that includes a proportional controller 72, a pump 74, and three bladders 76 that are secured to the chassis. The proportional controller 72 measures the attitude and depth to the assembly 10 relative to mean sea level and generates control inputs to the pump 74 to keep the assembly at an optimum depth in the water. The pump 74 fills or evacuates the bladders 76 according to the inputs received from the proportional controller 72. The bladders 76 are fashioned of a non-porous flexible material that is easily deformed. The pump 74 is connected by wires to the cord 70 and are powered from excess electrical power generated by the generators 18, but also could be easily supplemented from driveshaft motions or other optional sources such as an additional battery (not shown).

Pressure sensors may also be included in the inner cavity of the main body member 12 and in the buoys 24 and may be used to send control data to the pump 74 and bladders 76 for adjusting the assembly attitude. It may be desirable to have assemblies 10 raised or lowered, in relation to waves, for maintaining optimal buoy stroke (too high or low results in reduced buoy action). The sensor data form the inner cavity data integrates with the buoy pressure data. Buoy input to controls may be from pressure sensors located at buoy's lower shell. These sensors provide data to a control matrix of an array of assemblies. That is, individual buoy movements contribute to mapping entire wave fields engaging an array. "Downwave" modules use data for predicting wave action, interference, cancellation that are likely to engage them and optimally pre-adjust the generator "just-in-time". The result at most times enables near fully submerged, wave-following buoys (most buoyancy force and driveshaft travel length responding to subject wave).

Housed in the inner cavity of the main body 12, a control system may incorporate sensor networks including pressure sensors in the buoy 24. Due to independent buoy 24 motions, an associated sensor would require wireless data transmission to buoyancy chamber controls and such radio transmission has possibly deleterious effect to marine bio-forms. Improved sensing means are contained in the inner cavity, only, within and between which inner cavity walls and structural foam is provided signal attenuating liner thereby reducing or eliminating external signal transmission.

Sensing means comprise non-contacting proximity sensor, associated with the axle 42, which counts revolution quantity, velocity, and direction relative to start position. Axle 42 and sensor zero stage may be neutrally located near mid-point, between a buoy and drive rod 22 fully extended and retracted positions, and thus deviations from zero stage indicate buoy 24 and drive rod 22 position. A number of such sensors, associated with respective buoys of a plurality of assemblies, form composite data of the positions of all buoys 24 of an array and, thus, a wave by wave profile of the ambient seascape. Sequential updates provide predictors for assessment of wave field motions, for example, by combining disparate geographic data points that may indicate the eventual creation or dissipation of interference wave amplitudes at specific positions in the future. Such data is incorporated in the control system to precisely adjust generator properties just-in-advance of incoming waves. A desirable feature is expressed when a buoy 24 follows a wave surface, while remaining near full submergence, utilizing maximal buoyancy force and axle 42 travel length to power electrical generators 18.

Buoy wave-following capability is affected by generator 18 loads expressed through the rack and pinion motion converter. Large loads may induce back-forces into the system that stall, or even stop, buoy motion. While this condition is desirable in module servicing or certain stages of power extraction, for example, to hold down buoy in submerged position for eventual release in approaching wave crests or to hold up buoy in overly energetic wave conditions, also desirable is to control such features. For such purpose, generator coil segments are separable, by switches, from the coils in the stationary ring thereby enabling individual segments to be taken out of loop and diverting the electromotive force affecting the assembly. In effect, the variably exerted generator loads may incorporate with buoy sensing means to thereby form precise control topology for improving the operation and electrical output of a module array.

At times a module 10 may raise or lower to disadvantageous position due to environmental influences such as wave activity or changes of water temperature. At such instance is desirable for the module 10 to reposition at attitudes promoting optimal buoy 24 and drive rod 22 operation. For the purpose, buoyancy chamber pressure sensor indicates its position relative to the hydroface. When a module 10 sinks or floats out of range of optimal operational positions, pumps 74 are activated to introduce seawater to or expel seawater from bladders 76 thereby adjusting buoyancy of the chamber.

Figure 5:
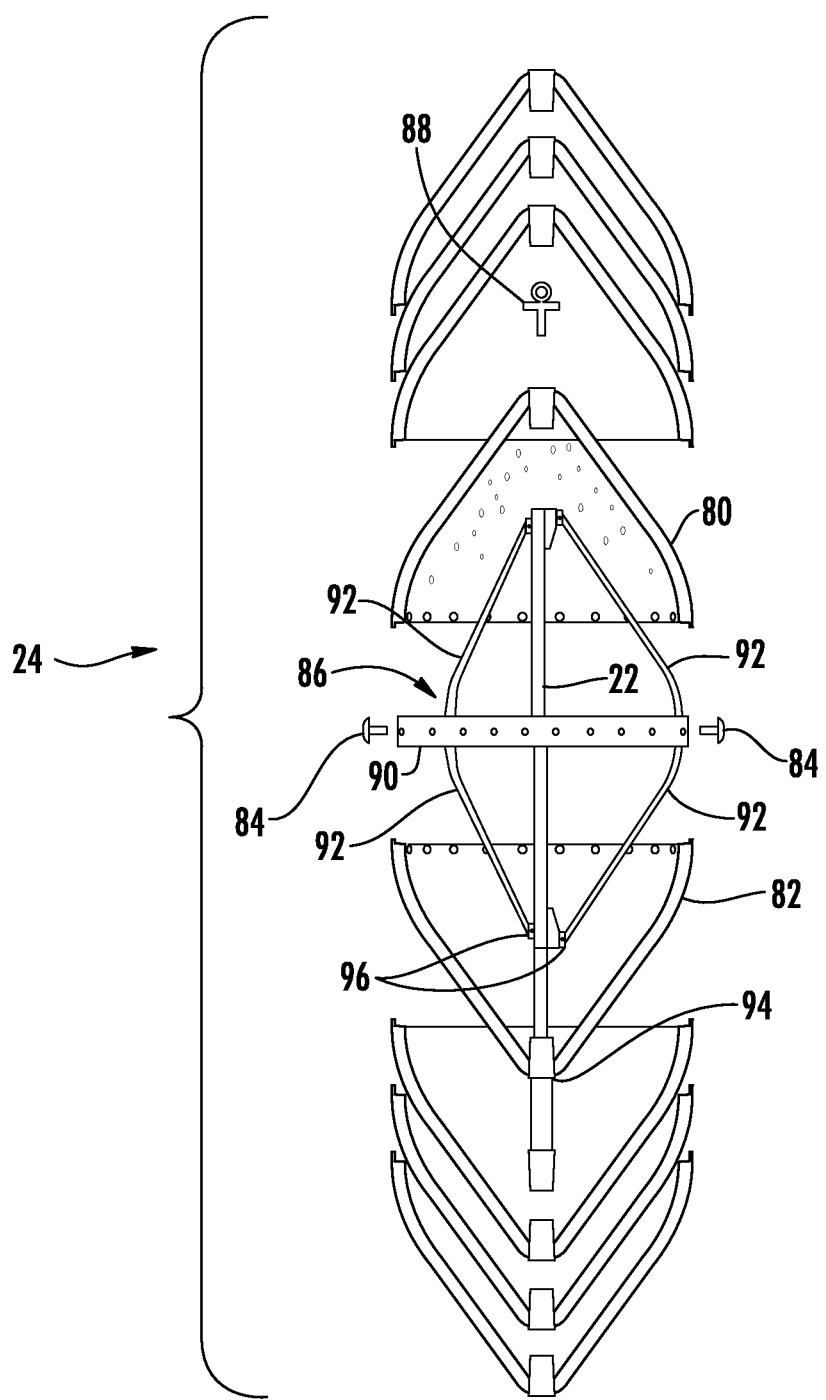
FIG. 5 is a exploded view of a buoy showing how the upper and lower shells stack together and the superstructure is assembled.

Referring to FIGS. 1, 2 and 5, each buoy 24 includes an upper shell 80 and a lower shell 82. The upper shell 80 and the lower shell 82 are secured together with rivets 84, or other suitable fasteners, around a superstructure 86 to form a watertight chamber, thereby making the buoy 24 highly buoyant. The upper shell 80 optionally includes an eyebolt 88 to assist in assembling, deployment and recovery of the assembled buoys 24. The superstructure 86 includes a radial cuff 90 that primarily supports and strengthens the upper and lower shells 80, 82. Internal braces 92 are secured within the chamber of the upper and lower shells 80, 82 to give the buoy 24 added strength and rigidity. The internal braces 92 are attached the drive rod 22 and radial cuff 90. Each shell 80, 82 is lined with foam or other buoyant material to neutralize the buoyancy of material forming the shells 80, 82 and the internal braces 92 container therein, thereby enhancing the buoyancy effect of the empty chamber.

One end of the drive rod 22 is passed through an aperture 94 on the lower 82 shell and secured to the upper shell 80. Optional bracing elements 96 are secured to around the drive rod 22 and to the lower shell 82 to reduce the strain on the lower shell 82 and drive rod 22 from the force of the waves impacting the buoy 24. Prior to deployment of the assembly, the unassembled shells 80, 82 of the buoys 24 may be stacked together for ease of storage and transportation to the deployment site.

The buoy 24 upper and lower shells 80, 82 have a conical shape with a circular cross-section and, together, they form a tetras. This tetras shape has been found to be optimal to smooth fluid flow about the buoy 24 in order to maximize stroke power, yet minimize rotational torque on the generator 18 assembly, thereby increasing the lifespan of the mechanical components.

In operation, the assembly 10 floats in a body of water with the buoys 24 partially submerged at the surface, and the remaining part of the assembly 10 submerged in the water. As each wave passes, the buoys 24 are raised and lowered moving the drive rods 22 in the tubular framing members 20. The motion of a drive rod 22 drives the counter-rotating portions of the generator 18. Each buoy/drive rod combination drives its own generator 18. The sum-total electrical output of an array of modules 10 may be transported to shore by an umbilical cord 70 or used to power an accessory module for desalination or hydrogen production operations. Each assembly 10 forms a module that can be interconnected to other modules to form an ocean wave energy web or matrix to mass produce electricity. The ocean wave energy web is capable of being deployed throughout the bodies of water of the world.

Figure 6:
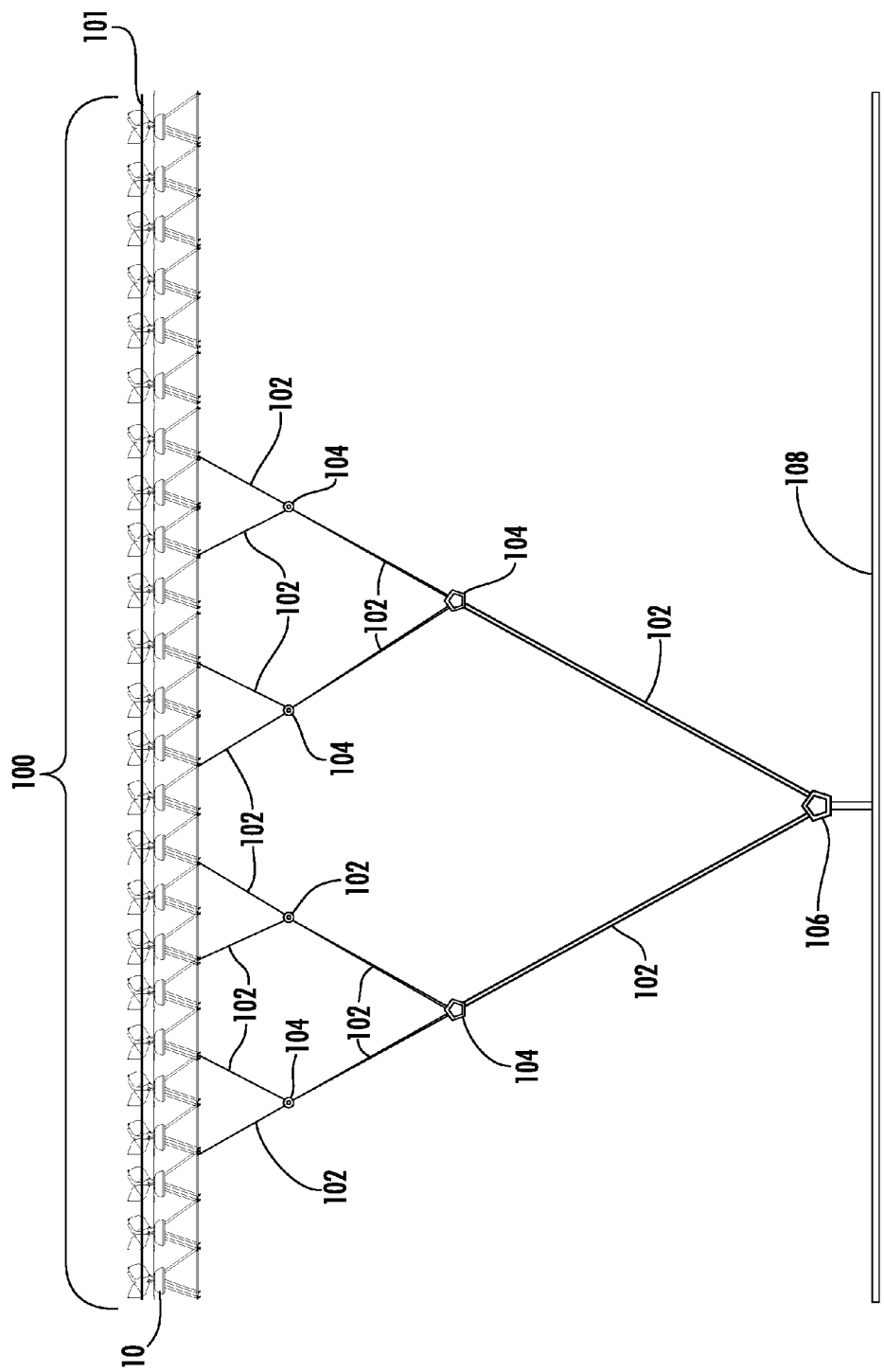
FIG. 6 is a method of mooring the ocean wave energy converters of the present invention to the sea floor.

Referring now to FIG. 6, arrays 100 generally form neutrally buoyant, horizontal planes near below the hydroface 101. Typically of breadth spanning multiple wavelengths, in most instances some array 100 portions are influenced by downward gravity forces from wave troughs while other portions are influenced by upward buoyancy force from buoys 24 and buoyancy chambers. Buoy drive shafts 22 freely travel, with only contacting tube bearings, and forces exerted on the truss tend to cancel out thereby having negligible effect on truss attitude. At times, however, large waves exert correspondingly higher forces, above operational range, causing extension of buoy drive shafts 22 to positions in contact with shock absorption means contained in tubular framing members 20.

At such instant buoys 24 and module 10 lower portions become more dependent systems than in normal operating conditions. These vertical forces, while efficiently distributed in the truss matrix, tend to be greatly dissipated in the water column by optional damper plate horizontally disposed between lower module framing members 28.

The self-stabilizing feature thus requires only light bottom, slack mooring. Examination of module array 100 mooring determined that relatively few mooring attachment points are required to be distributed among a module array 100 for keeping a module array 100 on station. Portions of the mooring lines 102, when conjoined and extended from terminals 104 at some depth below hydroface 101, perform efficiently in similar manner to laid rope for coalescing mooring stresses and inherently increasing tensile strength.

In large module arrays 100, deployed in deeper water, a plurality of such mooring lines 102 may in similar fashion be conjoined to terminals 104, at various intervals of lower depth, thereby resulting in fewer anchor points 106 to the seafloor 108 than if lines 102 were not conjoined. Mooring line terminals 104 may simply comprise knotting of the disparate lines 102 but such assembly does not obviate forces that may limit mooring line 102 flexibility when exposed to tensile forces. An improved mooring junction comprises box, with top and bottom opening, supporting spring-loaded reels. Lines 102 are wrapped on reels to some extent providing sufficient pay-out or take-up for maintaining sufficient tension that reduces line 102 sagging and shock loads exerted on truss modules 10.

It would be appreciated by those skilled in the art that various changes and modifications can be made to the illustrated embodiments without departing from the spirit of the present invention. All such modifications and changes are intended to be within the scope of the present invention.

I claim:

1. An apparatus for converting the kinetic energy of ocean waves into electricity, comprising:
    a main body member;
    a generator located within the main body member for generating electricity, the at least one generator having:
        an axle having a positive direction and a negative direction;
        an inner rotor driven by the axle, wherein the inner rotor is driven only in the negative direction of the axle;
        an outer rotor surrounding the inner rotor and being driven by the axle, wherein the outer rotor is driven only in the positive direction of the axle;
        a stationary ring between the inner rotor and the outer rotor; and
    a drive rod having a buoy attached to one end, the drive rod freely movable between an upstroke position and a downstroke position, the drive rod driving the generator as the drive rod reciprocates between the upstroke position and the downstroke position;
    whereby the undulation of the ocean waves relative to the buoy of the drive rod reciprocates the drive rod between the upstroke position and the downstroke position.

2. The apparatus of claim 1, wherein the inner rotor comprises a plurality of permanent magnets.

3. The apparatus of claim 1, wherein the buoy has a tetras shape.

4. The apparatus of claim 1, wherein the inner rotor rotates opposite the outer rotor.

5. The apparatus of claim 1, wherein the stationary ring comprises a plurality of coils.

6. The apparatus of claim 2, wherein the outer rotor comprises a plurality of permanent magnets.

7. The apparatus of claim 1, wherein there are three drive rods driving three generators.

8. The apparatus of claim 7, wherein the three drive rods are arranged in a tetrahedral configuration.

* * * * *